A. KIMMEL.
DOUGH CUTTING DEVICE.
APPLICATION FILED SEPT. 25, 1908.
925,919.
Patented June 22, 1909.
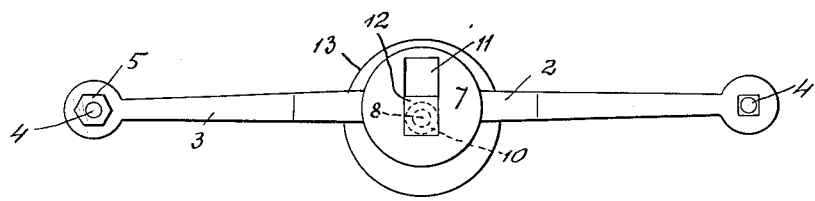
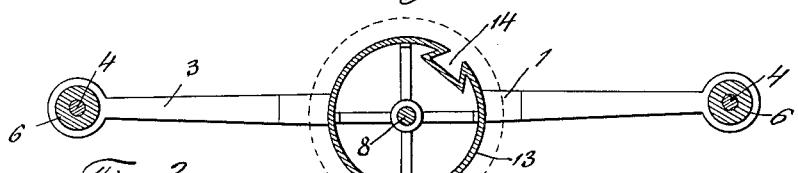
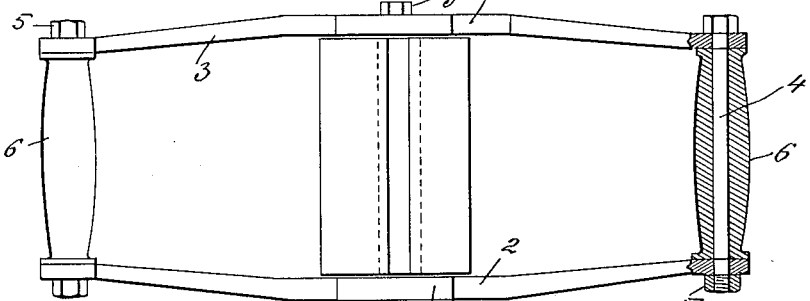
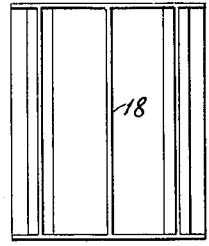 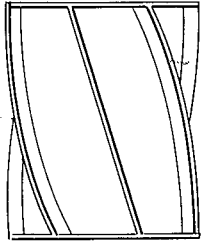 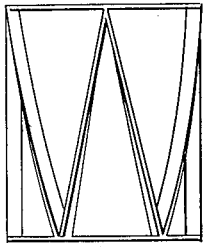 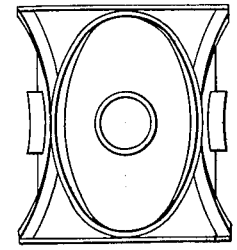
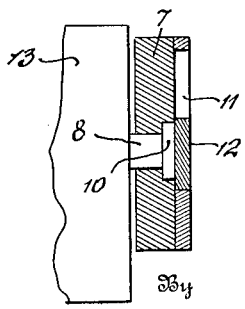
Witnesses
A. H. Rabsay,
K. H. Butler
Inventor
A. Kimmel
H. C. Evert &Co
Attorneys

UNITED STATES PATENT OFFICE.

ANDREW KIMMEL, OF REYNOLDSVILLE, PENNSYLVANIA.

DOUGH-CUTTING DEVICE.

No. 925,919.     Specification of Letters Patent.     Patented June 22, 1909.

Application filed September 25, 1908. Serial No. 454,798.

*To all whom it may concern:*

Be it known that I, ANDREW KIMMEL, a citizen of the United States of America, residing at Reynoldsville, in the county of Jefferson and State of Pennsylvania, have invented certain new and useful Improvements in Dough-Cutting Devices, of which the following is a specification, reference being had therein to the accompanying drawing.

This invention relates to a dough cutting device, and the primary object of my invention is to provide a novel device having interchangeable cutting cylinders for cutting and trimming dough into different configurations before the same is baked, whereby cakes of different configurations can be obtained.

Another object of my invention is to provide a novel rolling device that can be easily and quickly manipulated to successfully cut and trim dough and similar plastic material.

A further object of the invention is to provide a simple and durable device that can be advantageously used in bakeries, also as a culinary article for facilitating the making of cakes, wafers, cookies and similar edibles.

With the above and other objects in view which will more readily appear as the invention is better understood, the same consists in the novel construction, combination and arrangement of parts to be presently described and then specifically claimed.

In the drawings: Figure 1 is an elevation of my dough cutting device, Fig. 2 is a longitudinal sectional view, Fig. 3 is a plan partly broken away and partly in section, Fig. 4 is a plan of one form of cutting and trimming cylinder, Figs. 5 to 7 inclusive are similar views of cylinders of different designs, Fig. 8 is a cross-sectional view of the cylinder illustrated in Fig. 4 of the drawings, and Fig. 9 is a detail sectional view of a portion of the device.

In the accompanying drawings, 1 and 2 designate parallel arms having the ends 3 thereof bent inwardly and connected together by bolts 4 and nuts 5, said bolts supporting handles 6. The arms 1 and 2 are provided with central enlargements in which are journaled a transverse bolt 8 retained in said enlargements by a nut 9. The enlargement 7 of the arm 2, which receives the headed end 10 of the bolt, is provided with a recess 11 for a slide plate 12, said slide plate being designed to cover the headed end of the revoluble bolt 10 and prevent flour or similar material from interfering with the bearing of the bolt 10. The recess 11 is sufficiently large to permit of the slide plate 12 being elevated and the bolt 10 removed after the nut 9 is unscrewed from the opposite end thereof.

Mounted upon the revoluble bolt 8 is a drum 13 having a longitudinal dove-tailed groove 14 formed therein. This groove is adapted to receive an interior longitudinal rib 15 carried by a metallic cylinder 16 adapted to fit upon the drum 13. The cylinder 16 is placed upon the drum 13 by removing the arm 2, this being accomplished by removing the nuts 5 and 9, elevating the slide plate 12 and withdrawing the arm 2 and the revoluble bolt 8. The cylinder 16 shown in Figs. 4 and 8 has the ends thereof provided with peripheral flanges 17 and with longitudinal equally spaced peripheral ribs 18, dividing the periphery of the cylinder into compartments adapted to receive dough as the cutting device is passed over a batch of dough that has been previously rolled to a desired thickness by a rolling pin or similar device. The design of the cylinder 16 and the plasticity of the dough permits of oblong cakes being formed, while the design of the cylinders shown in Figs. 5 to 7 inclusive permits of cakes of various configurations—parallelogram, triangular or oval—being cut or trimmed from dough.

My dough cutting device with the exception of the handles 6, which are preferably made of wood, is made of a light and non-corrosive metal.

It is thought that the utility and operation of my device will be fully understood, and while in the drawings there is illustrated the preferred embodiments of my invention, I reserve the right to make alterations in the structural elements thereof without departing from the spirit of the invention.

Having now described my invention what I claim as new, is:—

1. A dough cutting device comprising two parallel arms, detachable handles connecting the ends of said arms, a detachable bolt journaled transversely of said arms, a slide plate carried by one of said arms for covering one end of said bolt, a drum mounted upon said bolt and having a dove-tailed longitudinal groove formed therein, a cylinder mounted upon said drum, an interior longitudinal rib carried by said cylinder and adapted to engage in said groove, peripheral flanges carried by said cylinder at the ends thereof, and peripheral ribs carried by said cylinder between said flanges, substantially as described.

2. A dough cutting device comprising parallel arms, handles connecting the ends of said arms, a detachable drum revolubly mounted between said arms, said drum having a longitudinal dove-tailed groove formed therein, a cylinder adapted to fit upon said drum, an interior longitudinal rib carried by said cylinder and adapted to engage in said groove, and peripheral ribs carried by said cylinder, substantially as described.

In testimony whereof I affix my signature in the presence of two witnesses.

ANDREW KIMMEL.

Witnesses:
MAX H. SROLOVITZ,
C. V. BROOKS.